US012087209B2

(12) United States Patent
Park et al.

(10) Patent No.: US 12,087,209 B2
(45) Date of Patent: Sep. 10, 2024

(54) DISPLAY DEVICE, DISPLAY CONTROLLER, DATA DRIVING CIRCUIT, AND LOW-POWER DRIVING METHOD

(71) Applicant: LG DISPLAY CO., LTD., Seoul (KR)

(72) Inventors: Daeho Park, Seoul (KR); YongHwa Park, Gyeonggi-do (KR); DaeSeok Oh, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/206,646

(22) Filed: Jun. 7, 2023

(65) Prior Publication Data

US 2024/0169884 A1 May 23, 2024

(30) Foreign Application Priority Data

Nov. 23, 2022 (KR) ........................ 10-2022-0158065

(51) Int. Cl.
*G09G 3/20* (2006.01)
*G09G 3/32* (2016.01)

(52) U.S. Cl.
CPC ............. *G09G 3/2096* (2013.01); *G09G 3/32* (2013.01); *G09G 2300/0842* (2013.01); *G09G 2310/0202* (2013.01); *G09G 2310/027* (2013.01); *G09G 2310/0291* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2021/0125564 A1* 4/2021 Yuan ..................... G11C 19/28

* cited by examiner

*Primary Examiner* — Christopher J Kohlman
(74) *Attorney, Agent, or Firm* — POLSINELLI PC

(57) ABSTRACT

A display device, a display controller, a data driving circuit, and a low power driving method that are capable of preventing undesirable current in the data driving circuit from being caused and reducing power consumption by using different types of clock signals needed for data storing processing according to whether there occurs no data transition or there occurs a data transition.

23 Claims, 14 Drawing Sheets

DISPLAY DEVICE, DISPLAY CONTROLLER, DATA DRIVING CIRCUIT, AND LOW-POWER DRIVING METHOD

CROSS-REFERENCE TO RELATED APPLICATION

This application claims the priority of Korean Patent Application No. 10-2022-0158065, filed on Nov. 23, 2022, which is hereby incorporated by reference in its entirety.

BACKGROUND

Field of the Disclosure

The present disclosure relates to electronic devices including display, and more specifically, to a display device, a display controller, a data driving circuit, and a low-power driving method.

Description of the Background

Recently, as display technology advances, various types of display devices for displaying images have been developed. For example, in terms of display technology, various types of display devices such as liquid crystal display devices, organic light emitting display devices, inorganic light emitting display devices, quantum dot display devices, and the like have been developed.

In terms of size, various sizes of display devices including mobile devices such as smart phones, tablets, and the like, and medium-sized and large-sized devices such as smart televisions, and the like have been developed.

In addition, in the field of display technology these days, power management has become increasingly important. In particular, a low-power design needs to be developed for reasons such as eco-friendliness, mobile environment, battery use, or the like. However, a phenomenon in which unnecessary power consumption increases for an unexpected reason may occur in display devices.

SUMMARY

Accordingly, the present disclosure is directed to a display device, a display controller, a data driving circuit, and a low-power driving method that substantially obviate one or more of problems due to limitations and disadvantages described above.

More specifically, the present disclosure is to provide a display device, a display controller, a data driving circuit, which are capable of being driven with low power, and a method of driving, with low power, the display device, the display controller, and the data driving circuit.

In addition, the present disclosure is to provide a display device, a display controller, and a data driving circuit, which are configured to be suitable for conditions such as an eco-friendly environment, a mobile environment, a battery usage environment, or the like, and a method of driving the display device, the display controller, and the data driving circuit with low power to be suitable for such conditions.

According to one or more aspects of the present disclosure, a display device includes a display panel including a plurality of data lines; a data voltage output circuit configured to output a respective data voltage to each of the plurality of data lines; a clock signal supply circuit configured to supply any one of a first type clock signal and a second type clock signal, which are different from each other; and a data voltage output control circuit configured to control the data voltage output circuit to output a data voltage corresponding to an analog voltage of N-th data or (N−1)-th data to the plurality of data lines the display panel according to whether a clock signal supplied from the clock signal supply circuit is the first type clock signal or the second type clock signal.

The first type clock signal and the second type clock signal may have different types of signal waveforms. For example, the first type clock signal may be a pulse type signal whose voltage level toggles or swings, and the second type clock signal may be a DC type signal whose voltage level is constant.

The data voltage output circuit may be configured to output a data voltage corresponding to an analog voltage of N-th data when the clock signal is the first type clock signal, or output a data voltage corresponding to an analog voltage of (N−1)-th data when the clock signal is the second type clock signal.

The clock signal supply circuit may be configured to supply the first type clock signal when the N-th data is different from the (N−1)-th data, and be configured to supply the second type clock signal when the N-th data is equal to the (N−1)-th data.

The data voltage output circuit may include a latch array including one or more latches for storing data, a digital-to-analog converter array including one or more digital-to-analog converters for converting data stored in the latch array into a data voltage corresponding to an analog voltage, and an output buffer array including one or more output buffers for outputting the data voltage to a corresponding data line.

When the clock signal is the first type clock signal, the data stored in the latch array may be transitioned from (N−1)th data to N-th data by the control of the data voltage output control circuit.

When the clock signal is the second type clock signal, the data stored in the latch array may be maintained as (N−1)th data by the control of the data voltage output control circuit.

According to one or more aspects of the present disclosure, a low-power driving method of a display device includes comparing N-th data with (N−1)-th data; outputting a first type clock signal when the N-th data and the (N−1)-th data are different, or outputting a second type clock signal different from the first type clock signal when the N-th data and the (N−1)-th data are equal; transitioning data stored in a latch array from the (N−1) th data to the N-th data according to the first type clock signal, or maintaining the data stored in the latch array as the (N−1) th data according to the second type clock signal; and outputting a data voltage corresponding to an analog voltage of the data stored in the latch array to a data line disposed on the display pane.

According to one or more aspects of the present disclosure, a display controller includes a data transmission section configured to transmit N-th data to a data driving circuit; a data computation circuit configured to determine whether the N-th data is equal to (N−1)-th data; and a clock signal controller configured to output a first type clock signal to the data driving circuit when the N-th data is equal to the (N−1)-th data, or output a second type clock signal different from the first type clock signal to the data driving circuit when the N-th data is different from the (N−1)-th data.

According to one or more aspects of the present disclosure, a display controller includes a data transmission section configured to transmit N-th data to a data driving circuit; a data computation circuit configured to determine whether the N-th data is equal to (N−1)-th data, and configured to output a clock enable signal having a low level voltage when the N-th data is equal to the (N−1)-th data, or output a clock enable signal having a high level voltage when the N-th data is different from the (N−1)-th data; and a reference clock signal supply circuit configured to supply a reference clock signal whose voltage level toggles or swings.

According to one or more aspects of the present disclosure, a data driving circuit includes a data reception section configured to receive N-th data after (N−1) th data from a display controller; a latch array in which the (N−1) th data is stored; a clock signal type determination circuit configured to determine whether a clock signal received from the display controller is a first type clock signal or a second type clock signal; and a data storage controller configured to control the N-th data to be stored in the latch array when the clock signal is the first type clock signal, or control the N-th data not to be stored in the latch array when the clock signal is the second type clock signal.

According to one or more aspects of the present disclosure, a data driving circuit includes a data reception section configured to receive N-th data following (N−1) th data from a display controller; a latch array in which the (N−1) th data is stored; a clock signal controller configured to receive a clock enable signal from the display controller, and output any one of a first type clock signal and a second type clock signal according to the clock enable signal; a clock signal type determination circuit configured to determine whether a clock signal received from the display controller is the first type clock signal or the second type clock signal; and a data storage controller configured to control the N-th data to be stored in the latch array when the clock signal is the first type clock signal, or control the N-th data not to be stored in the latch array when the clock signal is the second type clock signal.

According to one or more aspects of the present disclosure, by controlling clock signals needed for data driving, a display device, a display controller, and a data driving circuit may be provided that are capable of being driven with low power, and a method may be provided that drives, with low power, the display device, the display controller, and the data driving circuit.

According to one or more aspects of the present disclosure, by controlling clock signals needed for data driving, a display device, a display controller, and a data driving circuit may be provided that are configured to be suitable for conditions such as an eco-friendly environment, a mobile environment, a battery usage environment, or the like, and a method may be provided that drives the display device, the display controller, and the data driving circuit with low power to be suitable for such conditions.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION

Figure 1:
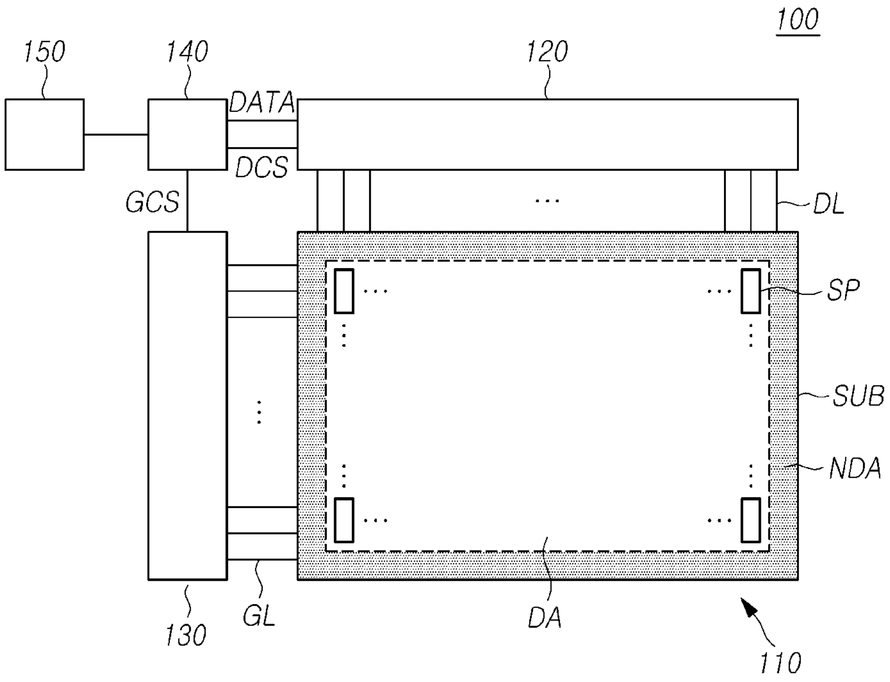
FIG. 1 illustrates an example system configuration of a display device according to aspects of the present disclosure.

Reference will now be made in detail to aspects of the present disclosure, examples of which may be illustrated in the accompanying drawings. In the following description, the structures, aspects, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example aspects described with reference to the accompanying drawings. The present disclosure may, however, be embodied in different forms and should not be construed as limited to the example aspects set forth herein. Rather, these example aspects are provided so that this disclosure may be sufficiently thorough and complete to assist those skilled in the art to fully understand the scope of the present disclosure. Further, the protected scope of the present disclosure is defined by claims and their equivalents. In the following description, where the detailed description of the relevant known function or configuration may unnecessarily obscure aspects of the present disclosure, a detailed description of such known function or configuration may be omitted. The shapes, sizes, ratios, angles, numbers, and the like, which are illustrated in the drawings to describe various example aspects of the present disclosure, are merely given by way of example. Therefore, the present disclosure is not limited to the illustrations in the drawings. Where the terms “comprise,” “have,” “include,” “contain,” “constitute,” “make up of,” “formed of,” and the like are used, one or more other elements may be added unless the term, such as “only,” is used. An element described in the singular form is intended to include a plurality of elements, and vice versa, unless the context clearly indicates otherwise.

Although the terms “first,” “second,” “A”, “B”, “(a)”, or “(b)”, and the like may be used herein to describe various elements, these elements should not be interpreted to be limited by these terms as they are not used to define a particular order or precedence. These terms are used only to distinguish one element from another; thus, related elements should not be interpreted to be limited by these terms as they are not used to define a particular order or precedence. Further, the expression of a first element, a second elements “and/or” a third element should be understood as one of the first, second and third elements or as any or all combinations of the first, second and third elements. By way of example, A, B and/or C may refer to only A, only B, or only C; any or some combination of A, B, and C; or all of A, B, and C.

For the expression that an element or layer is “connected,” “coupled,” or “adhered” to another element or layer, the element or layer may not only be directly connected, coupled, or adhered to another element or layer, but also be indirectly connected, coupled, or adhered to another element or layer with one or more intervening elements or layers “disposed” or “interposed” between the elements or layers, unless otherwise specified. Further, the another element may be included in one or more of the two or more elements connected, combined, coupled, or contacted (to) one another.

For the expression that an element or layer “contacts,” “overlaps,” or the like with another element or layer, the element or layer may not only directly contact, overlap, or the like with another element or layer, but also indirectly contact, overlap, or the like with another element or layer with one or more intervening elements or layers “disposed” or “interposed” between the elements or layers, unless otherwise specified.

Where positional relationships are described, for example, where the positional relationship between two parts is described using “on,” “over,” “under,” “above,” “below,” “beside,” “next,” or the like, one or more other parts may be located between the two parts unless a more limiting term, such as “immediate (ly),” “direct (ly),” or “close (ly)” is used. For example, where an element or layer is disposed “on” another element or layer, a third element or layer may be interposed therebetween. Furthermore, the terms “left,” “right,” “top,” “bottom, “downward,” “upward,” “upper,” “lower,” and the like refer to an arbitrary frame of reference. In describing a temporal relationship, when the temporal order is described as, for example, “after,” “subsequent,” “next,” or “before,” a case which is not continuous may be included unless a more limiting term, such as “just,” “immediate (ly),” or “direct (ly),” is used. In construing an element, the element is to be construed as including an error or tolerance range even where no explicit description of such an error or tolerance range is provided.

Further, the term “may” fully encompasses all the meanings of the term “may.” The term “at least one” should be understood as including any or all combinations of one or more of the associated listed items. For example, the meaning of “at least one of a first element, a second element, and a third element” encompasses the combination of all three listed elements, combinations of any two of the three elements, as well as each individual element, the first element, the second element, and the third element. The expression of a first element, a second elements “and/or” a third element should be understood as one of the first, second and third elements or as any or all combinations of the first, second and third elements. By way of example, A, B and/or C may refer to only A, only B, or only C; any or some combination of A, B, and C; or all of A, B, and C. Hereinafter, various example aspects of the present disclosure will be described in detail with reference to the accompanying drawings. In addition, for convenience of description, a scale in which each of elements is illustrated in the accompanying drawings may differ from an actual scale. Thus, the illustrated elements are not limited to the specific scale in which they are illustrated in the drawings.

Hereinafter, with reference to the accompanying drawings, various aspects of the present disclosure will be described in detail.

FIG. 1 illustrates an example system configuration of a display device 100 according to aspects of the present disclosure.

Referring to FIG. 1, the display device 100 according to aspects of the present disclosure may include a display panel 110 and a display driving circuit for driving the display panel 110.

The display driving circuit may include a data driving circuit 120, a gate driving circuit 130, and the like, and further include a display controller 140 for controlling the data driving circuit 120 and the gate driving circuit 130.

The display panel 110 may include a substrate SUB, and signal lines (also referred to as traces) such as a plurality of data lines DL, a plurality of gate lines GL, and the like disposed on the substrate SUB. The display panel 110 may include a plurality of subpixels SP connected to the plurality of gate lines GL and the plurality of data lines DL.

The display panel 110 may include a display area DA in which one or more images may be displayed and a non-display area NDA in which an image is not displayed. For example, a plurality of subpixels SP for displaying images may be disposed in the display area DA of the display panel 110. The driving circuits (120, 130, and 140) may be electrically connected to, or may be mounted on, the non-display area NDA of the display panel 110, and further, one or more pads to which one or more integrated circuits or one or more printed circuits are connected, may be disposed in the non-display area NDA.

The data driving circuit 120 is a circuit for driving the plurality of data lines DL, and may supply data signals to the plurality of data lines DL. The gate driving circuit 130 is a circuit for driving the plurality of gate lines GL, and may supply gate signals to the plurality of gate lines GL. The display controller 140 may supply a data control signal DCS to the data driving circuit 120 to control an operation time of the data driving circuit 120. The display controller 140 may supply a gate control signal GCS to the gate driving circuit 130 to control an operation time of the gate driving circuit 130.

The display controller 140 may control scan operation to be started according to a respective time processed for each frame, convert image data inputted from other devices or other image providing sources (e. g., host systems) to a data signal form used in the data driving circuit 120 and then supply image data DATA resulting from the converting to the data driving circuit 120, and control data driving to be performed at a predefined time according to a scan process.

The display controller 140 may receive several types of timing signals including a vertical synchronization signal VSYNC, a horizontal synchronization signal HSYNC, an input data enable signal DE, a clock signal CLK, and the like, together with input image data, from other devices or other image providing sources (e. g., host systems).

To control the data driving circuit 120 and the gate driving circuit 130, the display controller 140 may receive the timing signals such as the vertical synchronization signal VSYNC, the horizontal synchronization signal HSYNC, the input data enable signal DE, the clock signal CLK, and the like, generate several types of control signals DCS and GCS, and output the generated signals to the data driving circuit 120 and the gate driving circuit 130, For example, to control the gate driving circuit 130, the display controller 140 may supply several types of gate control signals GCS including a gate start pulse GSP, a gate shift clock GSC, a gate output enable signal GOE, and the like.

To control the data driving circuit 120, the display controller 140 may supply several types of data control signals DCS including a source start pulse SSP, a source sampling clock SSC, a source output enable (SOE) signal, and the like.

The display controller 140 may be implemented as a separate component from the data driving circuit 120, or integrated with the data driving circuit 120 and thus implemented in a single integrated circuit.

The data driving circuit 120 may drive a plurality of data lines DL by supplying data voltages corresponding to image data DATA received from the controller 140 to the plurality of data lines DL. The data driving circuit 120 may also be referred to as a source driving circuit.

The data driving circuit 120 may include, for example, one or more source driver integrated circuits SDIC.

Each source driver integrated circuit SDIC may include a shift register, a latch circuit, a digital-to-analog converter DAC, an output buffer, and the like. In some instances, each source driver integrated circuit SDIC may further include an analog to digital converter ADC.

For example, each source driving circuit SDIC may be connected to the display panel 110 in a tape automated bonding (TAB) type, or connected to a conductive pad such as a bonding pad of the display panel 110 in a chip on glass (COG) type or a chip on panel (COP) type, or connected to the display panel 110 in a chip on film (COF) type.

The gate driving circuit 130 may supply a gate signal of a turn-on level voltage or a gate signal of a turn-off level voltage according to the control of the display controller 140. The gate driving circuit 130 may sequentially drive a plurality of gate lines GL by sequentially supplying the gate signals of the turn-on level voltage to the plurality of gate lines GL.

For example, the gate driving circuit 130 may be connected to the display panel 110 in the tape automated bonding (TAB) type, or connected to a conductive pad such as a bonding pad of the display panel 110 in the chip on glass (COG) type or the chip on panel (COP) type, or connected to the display panel 110 in the chip on film (COF) type. The gate driving circuit 130 may be disposed in the non-display area NDA of the display panel 110 in a gate in panel (GIP) type. The gate driving circuit 130 may be disposed on or over a substrate SUB, or connected to the substrate SUB. That is, in the case of the GIP type, the gate driving circuit 130 may be disposed in the non-display area NDA of the substrate SUB. The gate driving circuit 130 may be connected to the substrate SUB in the case of the chip on glass (COG) type, the chip on film (COF) type, or the like.

For example, at least one of the data driving circuit 120 and the gate driving circuit 130 may be disposed in the display area DA. In this example, at least one of the data driving circuit 120 and the gate driving circuit 130 may be disposed not to overlap with subpixels SP, or disposed to overlap with one or more, or all, of the subpixels SP.

When a specific gate line is turned on by the gate driving circuit 130, the data driving circuit 120 may convert image data DATA received from the controller 140 into data voltages in an analog form and supply the data voltages resulting from the converting to the turned on data line.

The data driving circuit 120 may be located on, but not limited to, only one side or portion (e.g., an upper edge or a lower edge) of the display panel 110. In one or more aspects, the data driving circuit 120 may be located in, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or the like.

The gate driving circuit 130 may be located in only one side or portion (e.g., a left edge or a right edge) of the display panel 110. In one or more aspects, the gate driving circuit 130 may be connected to two sides or portions (e.g., a left edge and a right edge) of the panel 110, or be connected to at least two of four sides or portions (e.g., an upper edge, a lower edge, the left edge, and the right edge) of the panel 110 according to driving schemes, panel design schemes, or the like.

The display controller 140 may be a timing controller used in the typical display technology or a control apparatus/device capable of additionally performing other control functionalities in addition to the typical function of the timing controller. In one or more aspects, the controller 140 may be one or more other control circuits different from the timing controller, or a circuit or component in the control apparatus/device The display controller 140 may be implemented with various circuits or electronic components such as an integrated circuit (IC), a field programmable gate array (FPGA), an application specific integrated circuit (ASIC), a processor, and/or the like.

The display controller 140 may be mounted on a printed circuit board, a flexible printed circuit, or the like, and may be electrically connected to the data driving circuit 120 and the gate driving circuit 130 through a printed circuit board, a flexible printed circuit, or the like.

The display controller 140 may transmit signals to, and receive signals from, the data driving circuit 120 via one or more predefined interfaces. For example, such interfaces may include a low voltage differential signaling (LVDS) interface, an embedded clock point-point interface (EPI), a serial peripheral interface (SPI), and the like.

The display controller 140 may include storage media such as one or more registers, and the like.

In one or more aspects, the display device 100 may be a display device including a back-light unit such as a liquid crystal display device. In one or more aspects, the display device 100 may be a self-emission display device in which the display panel 110 itself emits light. For example, the self-emission display device may include an organic light emitting display device, an inorganic light emitting display device, a quantum dot display device, and the like.

In an aspect where the display device 100 is an organic light emitting display device, each subpixel SP may include, as a light emitting element, an organic light emitting diode (OLED), which is a self-emission element.

In an aspect where the display device 100 is an inorganic light emitting display device, each subpixel SP may include, as a light emitting element, an inorganic light emitting diode (ILED), which is a self-emission element and includes an inorganic material. In this aspect, the inorganic light emitting diode may include a micro light emitting diode (Micro LED).

In an aspect where the display device 100 is a quantum dot display device, each subpixel SP may include a light emitting element configured with quantum dots, which are self-emission semiconductor crystals.

Figure 2:
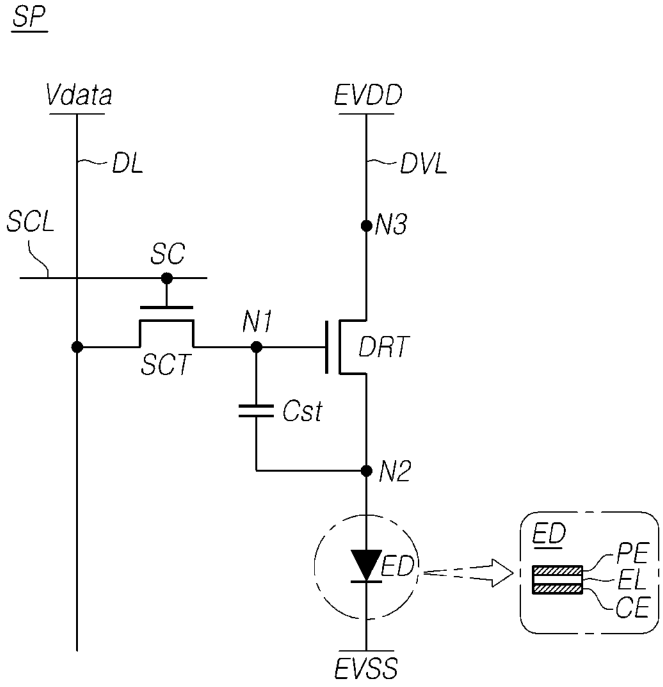
FIG. 2 illustrates an example equivalent circuit of a subpixel included in the display device according to aspects of the present disclosure.

FIG. 2 illustrates an example equivalent circuit of a subpixel SP included in the display device 100 according to aspects of the present disclosure.

Referring to FIG. 2, each of a plurality of sub-pixels SP disposed on the display panel 110 of the display device 100 according to aspects of the present disclosure may include a light emitting element ED, a driving transistor DRT, a scan transistor SCT, and a storage capacitor Cst.

Referring to FIG. 2, the light emitting element ED may include a pixel electrode PE and a common electrode CE, and include an emission layer EL located between the pixel electrode PE and the common electrode CE. In one or more aspects, a base voltage EVSS may be applied to the common electrode CE of the light emitting element ED.

The pixel electrode PE of the light emitting element ED may be an electrode disposed in each subpixel SP, and the common electrode CE may be an electrode commonly disposed in all or at least some of the plurality of subpixels SP. For example, the pixel electrode PE may be an anode electrode and the common electrode CE may be a cathode electrode. In another example, the pixel electrode PE may be a cathode electrode and the common electrode CE may be an anode electrode.

In one or more aspects, the light emitting element ED may be, for example, an organic light emitting diode (OLED), an inorganic light emitting diode (ILED), a quantum dot light emitting element (QDLED) or the like.

The driving transistor DRT may be a transistor for driving the light emitting element ED, and include a first node N1, a second node N2, and a third node N3.

The first node N1 of the driving transistor DRT may be a gate node of the driving transistor DRT, and may be electrically connected to a source node or a drain node of the scan transistor SCT. The second node N2 of the driving transistor DRT may be a source node or a drain node of the driving transistor DRT. The second node N2 may be also electrically connected to a source node or a drain node of a sensing transistor SENT, and connected to the pixel electrode PE of the light emitting element ED. The third node N3 of the driving transistor DRT may be electrically connected to a driving voltage line DVL for supplying the driving voltage EVDD.

The scan transistor SCT may be controlled by a scan signal SC, which is a type of gate signal, and may be connected between the first node N1 of the driving transistor DRT and a data line DL. In other words, the scan transistor SCT may be turned on or off according to the scan signal SC supplied through a scan signal line SCL, which is a type of the gate line GL, and control an electrical connection between the data line DL and the first node N1 of the driving transistor DRT.

The scan transistor SCT may be turned on by the scan signal SC having a turn-on level voltage, and transmit a data voltage Vdata supplied through the data line DL to the first node of the driving transistor DRT.

The scan transistor SCT may be an n-type transistor or a p-type transistor. In an example where the scan transistor SCT is an n-type transistor, a turn-on level voltage of the scan signal SC may be a high level voltage. In an example where the scan transistor SCT is a p-type transistor, a turn-on level voltage of the scan signal SC may be a low level voltage.

The storage capacitor Cst may be connected between the first node N1 and the second node N2 of the driving transistor DRT. The storage capacitor Cst may store the amount of electric charge corresponding to a voltage difference between both terminals and maintain the voltage difference between both terminals for a predetermined frame time. Accordingly, a corresponding subpixel SP may emit light for the predetermined frame time.

The storage capacitor Cst may be an external capacitor intentionally designed to be located outside of the driving transistor DRT, other than an internal capacitor, such as a parasitic capacitor (e.g., a Cgs, a Cgd), that may be formed between the gate node and the source node (or drain node) of the driving transistor DRT.

The configuration of the subpixel SP shown in FIG. 2 is merely one example of a subpixel configuration. In other examples, the subpixel SP may be variously configured according design requirements. For example, the subpixel SP may further include one or more transistors, and/or further include one or more capacitors.

Figure 3:
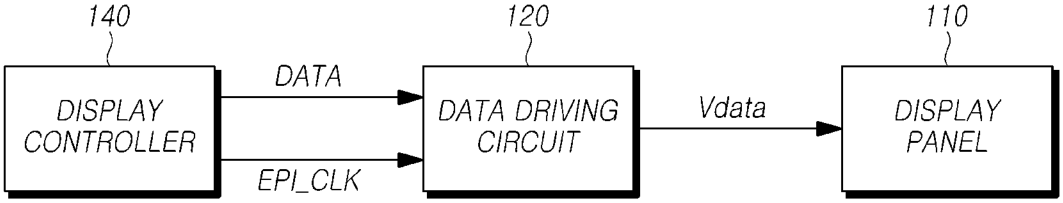
FIG. 3 illustrates an example configuration for data driving in the display device according to aspects of the present disclosure.

FIG. 3 illustrates an example configuration for data driving in the display device 100 according to aspects of the present disclosure.

Referring to FIG. 3, in one or aspects, the display device 100 may include a display controller 140 and a data driving circuit 120 as data driving elements for driving a plurality of data lines DL disposed in a display panel 110.

The display controller 140 may supply data DATA corresponding to an image signal to the data driving circuit 120, and supply a clock signal EPI_CLK needed for driving of the data driving circuit 120 to the data driving circuit 120.

The data driving circuit 120 may receive data DATA corresponding to an image signal from the display controller 140, and receive a clock signal EPI_CLK needed for driving of the data driving circuit 120 from the display controller 140.

The data driving circuit 120 may store the data DATA received from the display controller 140 based on the clock signal EPI_CLK received from the display controller 140.

The data driving circuit 120 may convert the stored data DATA into a data voltage Vdata corresponding to an analog voltage, and output the resulting data voltage Vdata to the display panel 110. More specifically, the data driving circuit 120 may convert the stored data DATA into a data voltage Vdata corresponding to an analog voltage, and output the resulting data voltage Vdata to the data line DL of the display panel 110.

The display controller 140 may transmit the data DATA and the clock signal EPI_CLK to the data driving circuit 120 through a predefined interface. For example, such interfaces between the display controller 140 and the data driving circuit 120 may include a low voltage differential signaling (LVDS) interface, an embedded clock point-point interface (EPI), a serial peripheral interface (SPI), and the like. Hereinafter, it is assumed that an interface between the display controller 140 and the data driving circuit 120 is the EPI.

Figure 4:
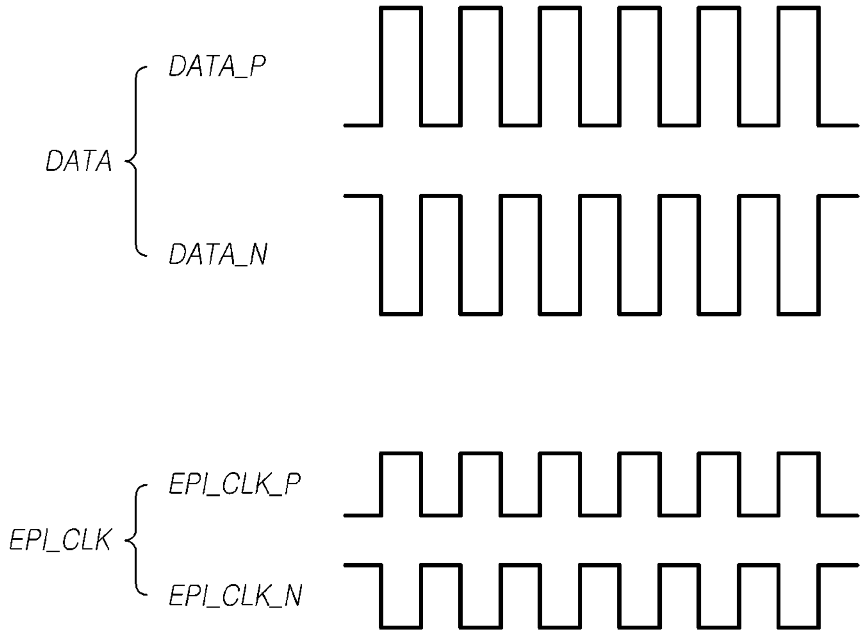
FIG. 4 illustrates example data and clock signals output from a display controller in the display device according to aspects of the present disclosure.

FIG. 4 illustrates example data DATA and clock signals EPI_CLK output from a display controller 140 in the display device 100 according to aspects of the present disclosure.

Referring to FIG. 4, data DATA output from the display controller 140 may be in the form of a differential signal. The data DATA may include positive data DATA_P and negative data DATA_N. For example, respective polarities of the positive data DATA_P and the negative data DATA_N may be opposite to each other, and respective phases of the positive data DATA_P and the negative data DATA_N may have an inverse relationship.

Referring to FIG. 4, a clock signal EPI_CLK output from the display controller 140 may be in the form of a differential signal. The clock signal EPI_CLK may include a positive clock signal EPI_CLK_P and a negative clock signal EPI_CLK_N. For example, respective polarities of the positive clock signal EPI_CLK_P and the negative clock signal EPI_CLK_N may be opposite to each other, and respective phases of the positive clock signal EPI_CLK_P and the negative clock signal EPI_CLK_N may have an inverse relationship.

Figure 5:
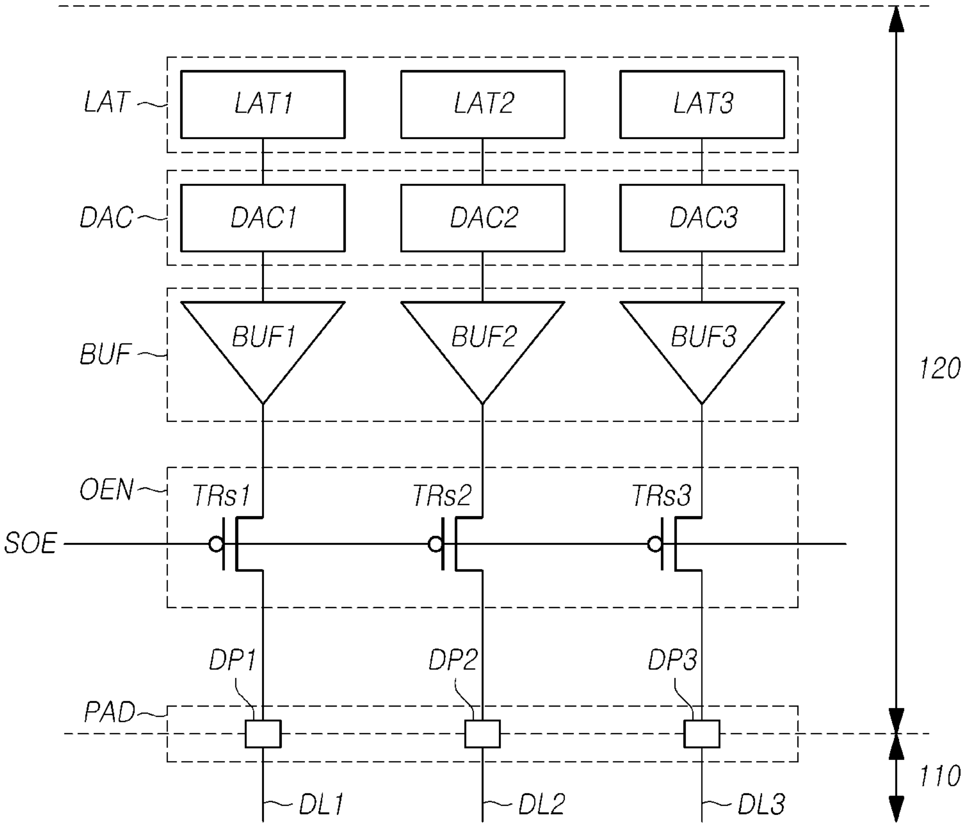
FIG. 5 illustrates an example data driving circuit of the display device according to aspects of the present disclosure.

FIG. 5 illustrates an example data driving circuit 120 of the display device 100 according to aspects of the present disclosure.

Referring to FIG. 5, the data driving circuit 120 may include a pad array PAD, a latch array LAT, a digital-to-analog converter array DAC, an output buffer array BUF, and an output enable element array OEN.

The pad array PAD may include a plurality of pads (DP1, DP2, and DP3), and the plurality of pads (DP1, DP2, and DP3) may be respectively electrically connected to a plurality of data lines (DL1, DL2, and DL3) disposed in the display panel 110.

The latch array LAT may store data DATA received from the display controller 140. For example, the data DATA may correspond to an image signal and may represent a digital value.

The latch array LAT may include a plurality of latches (LAT1, LAT2, and LAT3) respectively corresponding to the plurality of data lines (DL1, DL2, and DL3).

The digital-to-analog converter array DAC may convert data DATA stored in the latch array LAT into a data voltage Vdata corresponding to an analog voltage.

The digital-to-analog converter array DAC may include a plurality of digital-to-analog converters (DAC1, DAC2, and DAC3) respectively corresponding to the plurality of data lines (DL1, DL2, and DL3).

The output buffer array BUF may output the data voltage Vdata converted by the digital-to-analog converter array DAC.

The output buffer array BUF may include a plurality of output buffers (BUF1, BUF2, and BUF3) respectively corresponding to the plurality of data lines (DL1, DL2, and DL3).

The output enable element array OEN may control an electrical connection between the output buffer array BUF and the pad array PAD.

The output enable element array OEN may include a plurality of transistors (TRs1, TRs2, and TRs3) respectively corresponding to the plurality of data lines (DL1, DL2, and DL3).

A source output enable signal SOE may be applied to a gate node of each of the plurality of transistors (TRs1, TRs2, and TRs3).

When the source output enable signal SOE has a turn-on level voltage for turning on each of the plurality of transistors (TRs1, TRs2, and TRs3), the plurality of transistors (TRs1, TRs2, and TRs3) may be turned on, and the plurality of buffers (BUF1, BUF2, and BUF3) may be electrically connected to the plurality of pads (DP1, DP2, and DP3), respectively.

Accordingly, a data voltage Vdata output from a first buffer BUF1 may be supplied to a first data line DL1 connected to a first pad DP1 through a first transistor TRs1. Accordingly, a data voltage Vdata output from a second buffer BUF2 may be supplied to a second data line DL2 connected to a second pad DP2 through a second transistor TRs2. Accordingly, a data voltage Vdata output from a third buffer BUF3 may be supplied to a third data line DL3 connected to a third pad DP3 through a third transistor TRs3.

When the source output enable signal SOE has a turn-off level voltage for turning off each of the plurality of transistors (TRs1, TRs2, and TRs3), the plurality of transistors (TRs1, TRs2, and TRs3) may be turned off, and the plurality of buffers (BUF1, BUF2, and BUF3) may be electrically disconnected to the plurality of pads (DP1, DP2, and DP3).

The turn-on level voltage of the source output enable signal SOE may be a voltage capable of turning on each of the plurality of transistors (TRs1, TRs2, and TRs3), and the turn-off level voltage of the source output enable signal SOE may be a voltage capable of turning off each of the plurality of transistors (TRs1, TRs2, and TRs3). As shown in FIG. 5, when the plurality of transistors (TRs1, TRs2, and TRs3) are p-type transistors, the turn-on level voltage may be a low level voltage, and the turn-off level voltage may be a high level voltage. When the plurality of transistors (TRs1, TRs2, and TRs3) are n-type transistors, the turn-on level voltage may be a high level voltage, and the turn-off level voltage may be a low level voltage.

Figure 6:
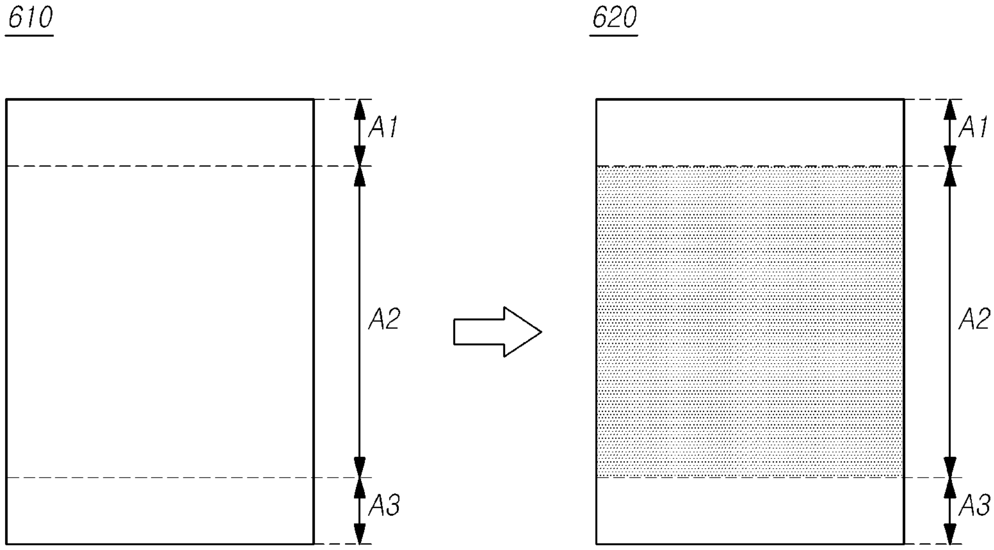
FIG. 6 illustrates an example (N−1)th frame screen 610 and an example N-th frame screen 620 in the display device according to aspects of the present disclosure.

FIG. 6 illustrates an example (N−1)th frame screen 610 and an example N-th frame screen 620 in the display device 100 according to aspects of the present disclosure.

In some instance, images displayed on the display panel 110 may not be updated frame by frame. In the example of FIG. 6, when comparing the (N−1)th frame screen 610 with the N-th frame screen 620, among a first area A1, a second area A2, and a third area A3, the first area A1 and the third area A3 may be areas where an image being displayed is not updated according to frame updates, and the second area A2 may be an area where images being displayed are updated according to frame updates. Hereinafter, for convenience of description, an area in which an image being displayed is not updated according to frame updates may be referred to as a static area.

Hereinafter, data driving according to aspects of the present disclosure will be described, as an example, based on the frame update scenario as shown in FIG. 6.

Figure 7:
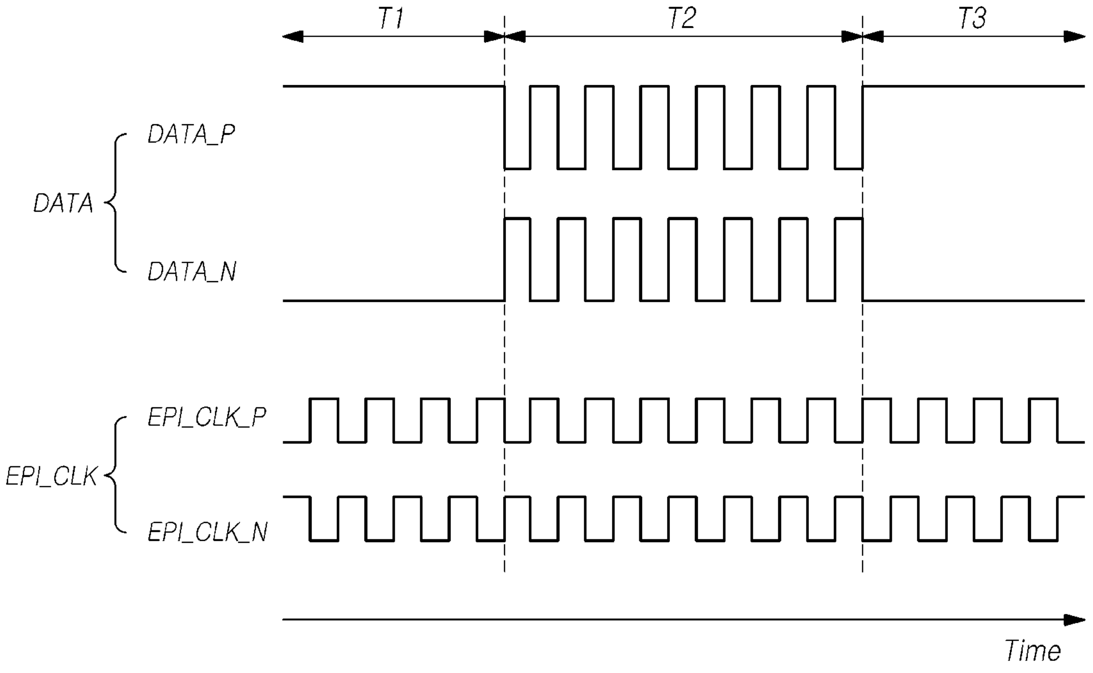
FIG. 7 illustrates example data and clock signals output from the display controller when the N-th frame screen 620 includes an area in which there occurs no data transition in the display device according to aspects of the present disclosure.

FIG. 7 illustrates example data DATA and clock signals EPI_CLK output from the display controller 140 when the N-th frame screen 620 as in FIG. 6 includes a static area in which there occurs no data transition in the display device 100 according to aspects of the present disclosure.

Referring to FIG. 7, a period for displaying the N-th frame screen 620 on the display panel 110 may include a first period T1 for displaying the first area A1, a second period T2 for displaying the second area A2. and a third period T3 for displaying the third area A3.

Referring to FIG. 7, according to the frame update scenario as shown in FIG. 6, since the first area A1 and the third area A3 may be areas where there occurs no image update according to frame updates, and the second area A2 may be an area where there occurs an image update according to frame updates, there occurs no data transition during the first period T1 and the third period T3, and there occurs a data transition during the second period T2.

For example, the data DATA may be in the form of a differential signal and may include positive data DATA_P and negative data DATA_N. Respective polarities of the positive data DATA_P and the negative data DATA_N may be opposite to each other.

Referring to FIG. 7, the display controller 140 may output a clock signal EPI_CLK whose voltage level toggles (or swings) regardless of whether data is transited or not. That is, during the first, second and third periods (T1, T2, and T3), the clock signal EPI_CLK may have a same signal waveform in which its voltage level toggles.

For example, the clock signal EPI_CLK may be in the form of a differential signal and may include a positive clock signal EPI_CLK_P and a negative clock signal EPI_CLK_N. Respective polarities of the positive clock signal EPI_CLK_P and the negative clock signal EPI_CLK_N may be opposite to each other.

Figure 8:
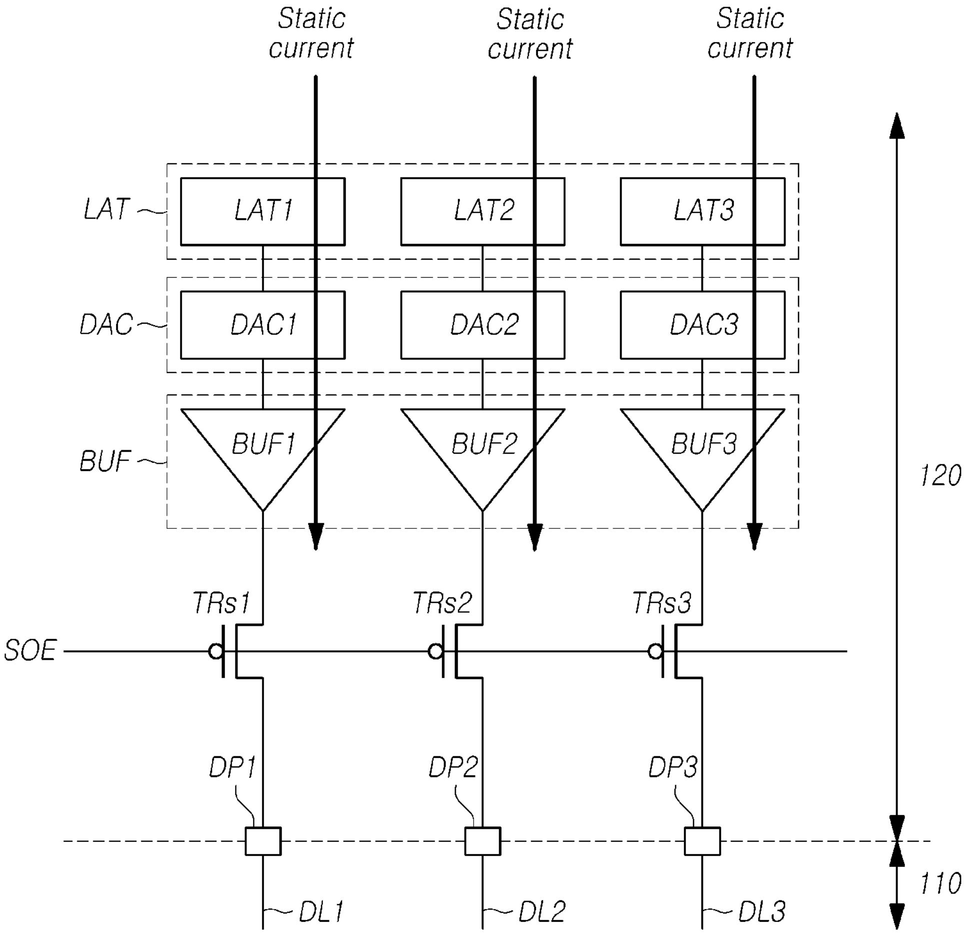
FIG. 8 illustrates an example phenomenon in which static current is generated in the data driving circuit when the N-th frame screen 620 includes an area in which there occurs no data transition in the display device according to aspects of the present disclosure.

FIG. 8 illustrates an example phenomenon in which static current is generated in the data driving circuit 120 when the N-th frame screen 620 as in FIGS. 6 and 7 includes an area in which there occurs no data transition in the display device 100 according to aspects of the present disclosure.

Referring to FIG. 8, in a situation where the N-th frame screen 620 includes a static area in which there occurs no data transition, unlike the (N−1)-th frame screen 610, when data driving to display an image in the static area is performed, undesirable current may be generated inside of the data driving circuit 120. Herein, when there occurs no data transition, the current caused inside of the data driving circuit 120 is referred to as a static current.

As the voltage level of the clock signal EPI_CLK toggles even when there occurs no data transition, a storage operation in which data DATA is stored in the latch array LAT, a conversion operation by the digital-to-analog converter array DAC, and an output operation by the output buffer array BUF may be performed, and thereby, a static current may be caused. In the data driving circuit 120, such a static current may be caused in the latch array LAT, the digital-to-analog converter array DAC, and the output buffer array BUF.

If a static current is caused in the data driving circuit 120 even when there occurs no data transition, power consumption may be undesirably increased.

To address these issues, according to one or more aspects of the present disclosure, a low-power driving method is provided that is capable of preventing undesirable power consumption, and a display controller 140 and a data driving circuit 120 for implementing the low-power driving method are provided.

Figure 9:
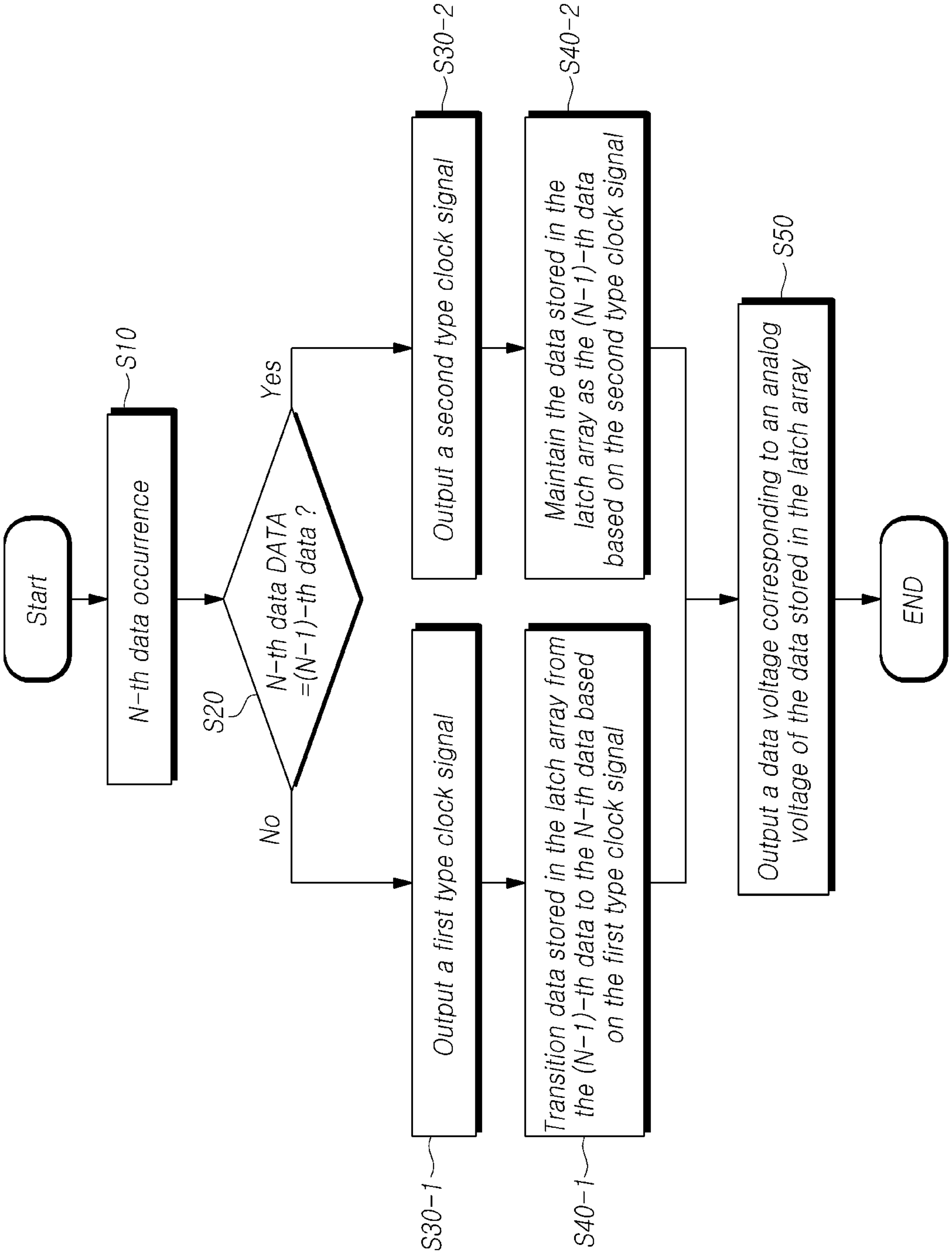
FIG. 9 is an example flowchart of a low-power driving method of the display device according to aspects of the present disclosure.

FIG. 9 illustrates an example flowchart of a low-power driving method of the display device 100 according to aspects of the present disclosure. It should be noted hereinafter that for convenience of description, discussions are provided based on a driving process for displaying the N-th frame screen 620 following the (N−1)-th frame screen 610 as in FIGS. 6, 7, and 8.

Referring to FIG. 9, in one or more aspects, the low-power driving method of the display device 100 may include a data generating step S10, a comparing step S20, and a clock signal outputting step (S30-1 or S30-2), a data storing control step (S40-1 or S40-2), and a data voltage outputting step S50.

In the data generating step S10, the display controller 140 may recognize the presence of N-th data corresponding to the N-th frame, which is a frame to be currently displayed (current frame).

In the comparing step S20, the display controller 140 may compare the N-th data DATA with the (N−1)-th data DATA. In this case, the N-th data DATA may be data corresponding to the N-th frame, which is a frame to be displayed (current frame), and the (N−1)-th data DATA may be data corresponding to the (N−1) th frame, which is a frame being currently displayed (previous frame).

In the clock signal outputting step (S30-1 or S30-2), when the N-th data DATA and the (N−1)-th data DATA are different, in S30-1, the display controller 140 or the data driving circuit 120 may output a first type clock signal (TYPE1 EPI_CLK).

In the clock signal outputting step (S30-1 or S30-2), when the N-th data DATA and the (N−1)-th data DATA are equal, in S30-2, the display controller 140 or the data driving circuit 120 may output a second type clock signal (TYPE2 EPI_CLK) different form the first type clock signal (TYPE1 EPI_CLK).

In the data storing control step (S40-1 or S40-2), the data driving circuit 120 may transition, according to the first type clock signal (TYPE1 EPI_CLK), data DATA stored in the latch array LAT from the (N−1)-th data DATA to the N-th data DATA, in step S40-1, or maintain, according to the second type clock signal TYPE2 EPI_CLK, the data DATA stored in the latch array LAT as the (N−1)-th data DATA, in step S40-2.

In the data voltage outputting step S50, the data driving circuit 120 may output a data voltage Vdata corresponding to an analog voltage of the data DATA stored in the latch array LAT to a data line DL disposed in the display panel 110. The data DATA stored in the latch array LAT may be the N-th data DATA or the (N−1)-th data DATA.

In one aspect, the comparing step S20 and the clock signal outputting step (S30-1 or S30-2) may be performed by the display controller 140, and the data storing control step (S40-1 or S40-2) and the data voltage outputting step S50 may be performed by the data driving circuit 120.

In another aspect, the comparing step S20 may be performed by the display controller 140, and the clock signal outputting step (S30-1 or S30-2), the data storing control step (S40-1 or S40-2), and the data voltage outputting step S50 may be performed by the data driving circuit 120.

Figure 10:
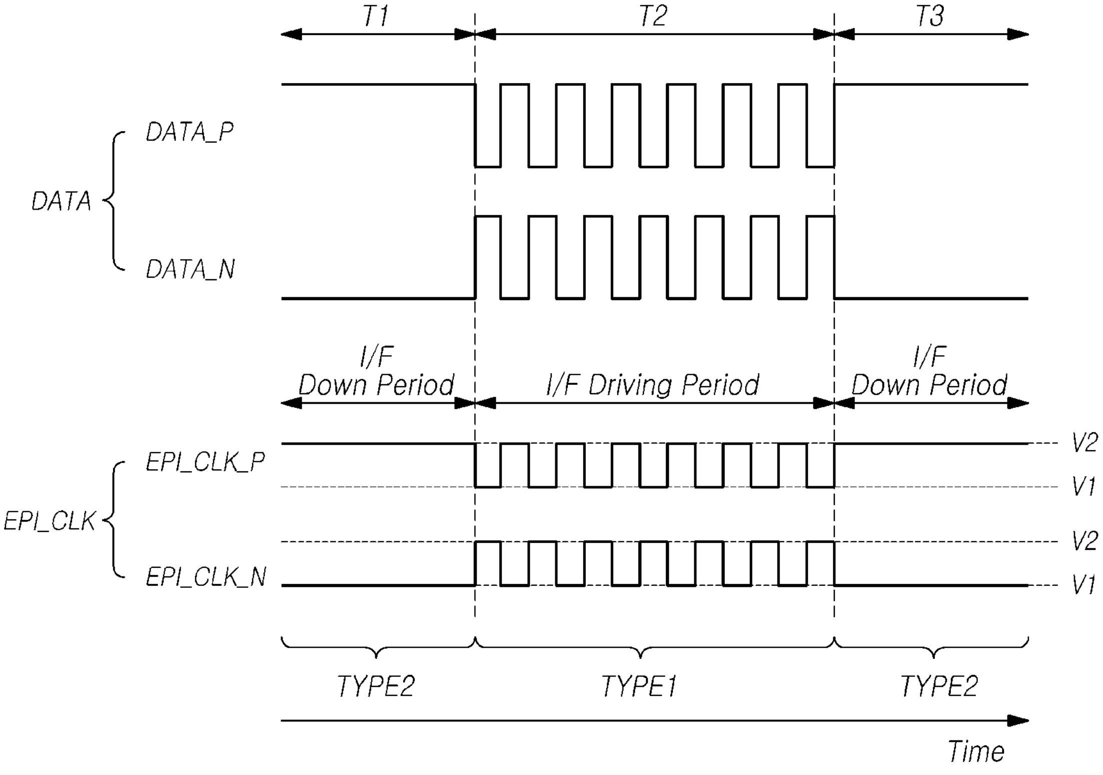
FIG. 10 illustrates example data and clock signals according to low-power driving when the N-th frame screen 620 includes an area in which there occurs no data transition in the display device according to aspects of the present disclosure.

FIG. 10 illustrates example data DATA and clock signals EPI_CLK according to low-power driving when the N-th frame screen 620 includes an area in which there occurs no data transition in the display device 100 according to aspects of the present disclosure.

Referring to FIG. 10, a period for displaying the N-th frame screen 620 on the display panel 110 may include, as in the configuration of FIG. 6, a first period T1 for displaying the first area A1, a second period T2 for displaying the second area A2. and a third period T3 for displaying the third area A3. According to the frame update scenario as shown in FIG. 6, since the first area A1 and the third area A3 may be areas where there occurs no image update according to frame updates, and the second area A2 may be an area where there occurs an image update according to frame updates, there occurs no data transition during the first period T1 and the third period T3, and there occurs a data transition during the second period T2.

Referring to FIG. 10, in one or more aspects, the display device 100 may utilize a clock signal control technology for low-power driving.

Referring to FIG. 10, in the display apparatus 100, the period T2 in which there occurs a data transition may be referred to as an interface driving period (I/F driving period), and the period (T1 or T3) in which there occurs no data transition may be referred to as an interface down period (I/F down period).

Referring to FIG. 10, during the period T2 in which there occurs a data transition, a clock signal EPI_CLK used for data storage processing may be a first type clock signal TYPE1 EPI_CLK. That is, during the interface driving period (I/F driving period), the clock signal EPI_CLK may be the first type clock signal TYPE1 EPI_CLK.

Referring to FIG. 10, during the period (T1 or T3) in which there occurs no data transition, a clock signal EPI_CLK used for data storing processing may be a second type clock signal TYPE2 EPI_CLK. That is, during the interface down period (I/F down period), the clock signal EPI_CLK may be the second type clock signal TYPE2 EPI_CLK.

This data storing process may refer to a process for storing data DATA received from the display controller 140 in the latch array LAT.

The first type clock signal TYPE1 EPI_CLK and second type clock signal TYPE2 EPI_CLK may have different signal waveforms.

Referring to FIG. 10, for example, the first type clock signal TYPE1 EPI_CLK may be a pulse type signal whose voltage level toggles or swings.

When the clock signal EPI_CLK is in the form of a differential signal, a positive clock signal EPI_CLK_P and a negative clock signal EPI_CLK_N included in the first type clock signal TYPE1 EPI_CLK may be pulse type signals whose voltage levels toggle or swing.

The first type clock signal TYPE1 EPI_CLK may have a first voltage V1 and a second voltage V2 alternately and repeatedly. Each of the positive clock signal EPI_CLK_P and the negative clock signal EPI_CLK_N included in the first type clock signal TYPE1 EPI_CLK may have the first voltage V1 and the second voltage V2 alternately and repeatedly.

Referring to FIG. 10, for example, the second type clock signal TYPE2 EPI_CLK may be a DC type signal whose voltage level is constant.

When the clock signal EPI_CLK is in the form of a differential signal, a positive clock signal EPI_CLK_P and a negative clock signal EPI_CLK_N included in the second type clock signal TYPE2 EPI_CLK may be DC type signals whose voltage levels are constant.

The positive clock signal EPI_CLK_P included in the second type clock signal TYPE2 EPI_CLK may have a second voltage V2. The negative clock signal EPI_CLK_N included in the second type clock signal TYPE2 EPI_CLK may have a first voltage V1.

In the low-power driving method based on the clock signal control technique according to aspects of the present disclosure, the component that changes one of the first type clock signal TYPE1 EPI_CLK and the second type clock signal TYPE2 EPI_CLK to the other or selects any one of the first type clock signal TYPE1 EPI_CLK and the second type clock signal TYPE2 EPI_CLK may be the display controller 140 or the data driving circuit 120.

Hereinafter, the low-power driving method based on the clock signal control technique according to the aspects described above will be described in more detail.

Figure 11:
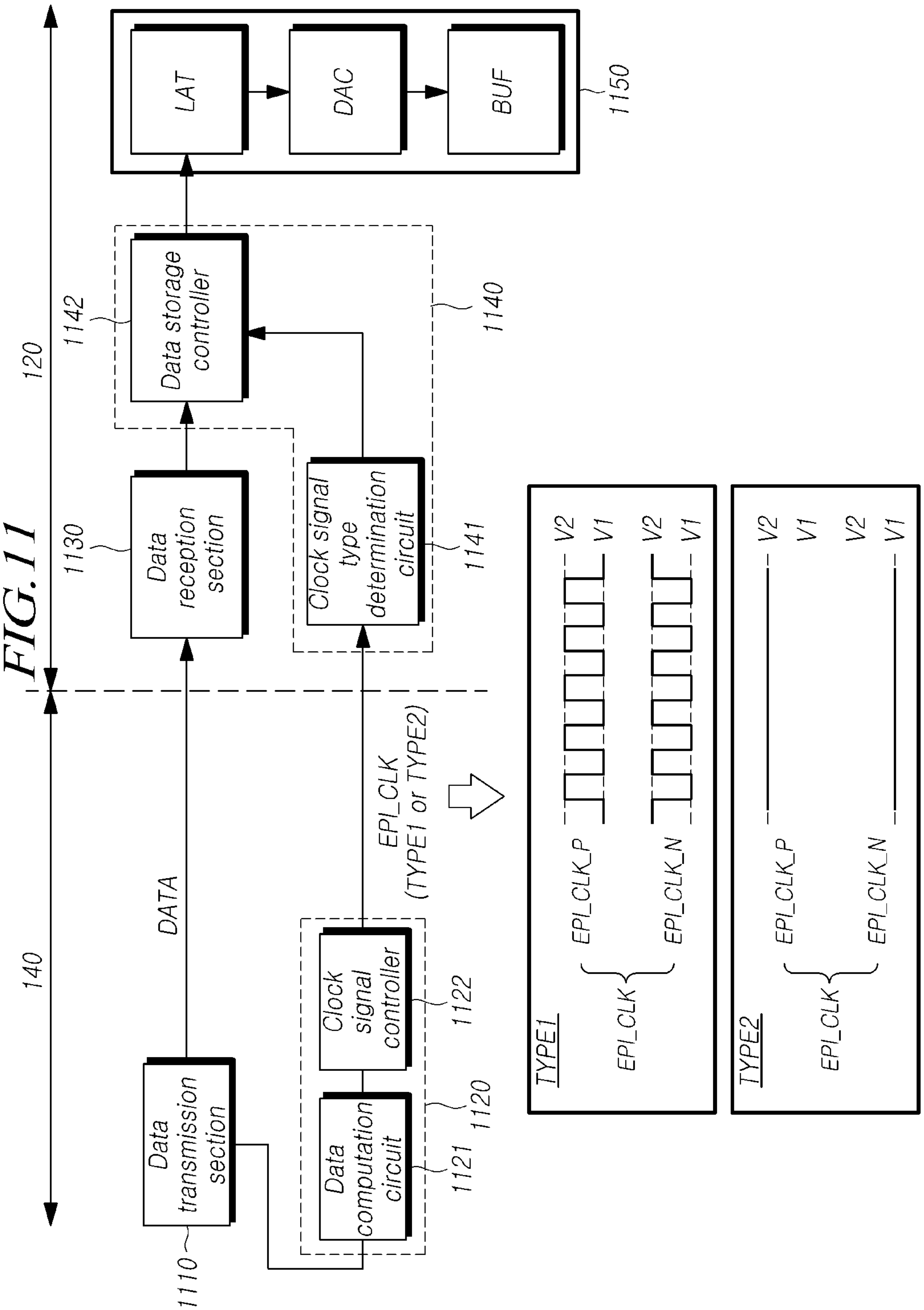
FIGS. 11 and 12 illustrate example low-power driving systems based on a clock signal control technique of the display device according to aspects of the present disclosure.
Figure 12:
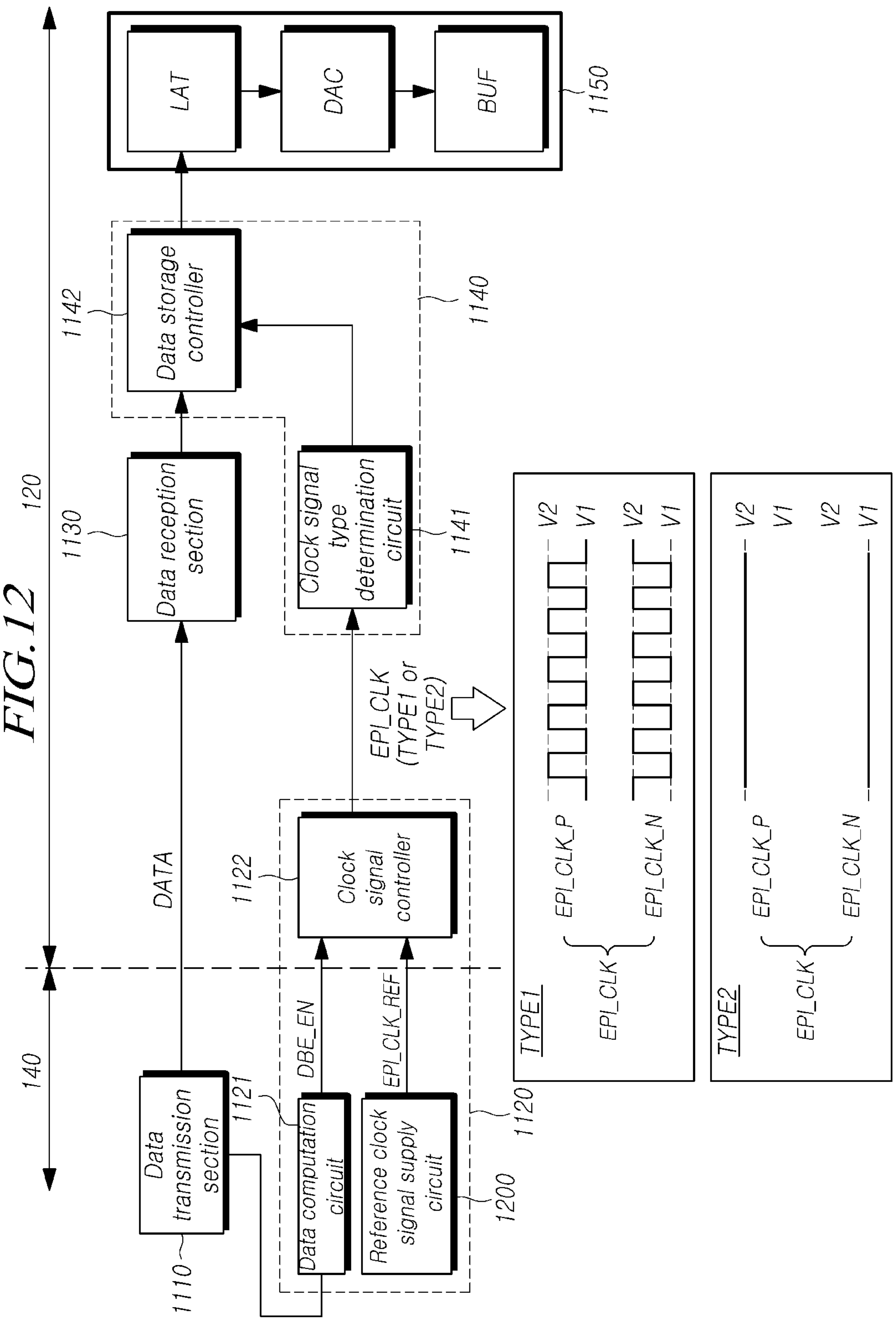
Figure 13:
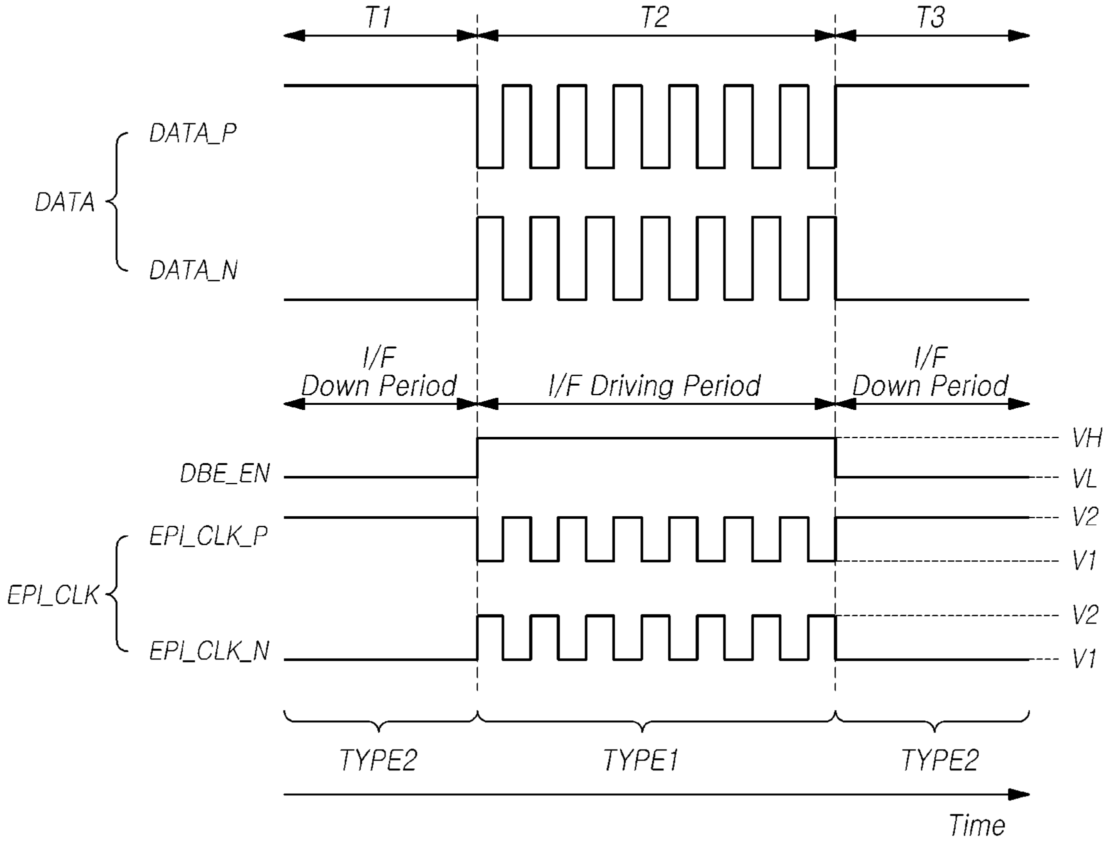
FIG. 13 illustrates data, clock signals, and a clock enable signal in the low power driving system of FIG. 12.

FIGS. 11 and 12 illustrate example low-power driving systems based on the clock signal control technique of the display device 100 according to aspects of the present disclosure. FIG. 13 illustrates data, clock signals, and a clock enable signal in the low power driving system of FIG. 12.

In one or more aspects, in the low-power driving system based on the clock signal control technique shown in FIG. 11, the component that changes one of the first type clock signal TYPE1 EPI_CLK and the second type clock signal TYPE2 EPI_CLK to the other or selects any one of the first type clock signal TYPE1 EPI_CLK and the second type clock signal TYPE2 EPI_CLK may be the display controller 140. In one or more aspects, in the low-power driving system based on the clock signal control technique shown in FIG. 12, the component that changes one of the first type clock signal TYPE1 EPI_CLK and the second type clock signal TYPE2 EPI_CLK to the other or selects any one of the first type clock signal TYPE1 EPI_CLK and the second type clock signal TYPE2 EPI_CLK may be the data driving circuit 120.

Referring to FIGS. 11 and 12, in one or more aspects, the display device 100 according to aspects of the present disclosure may include a data transmission section 1110, a clock signal supply circuit 1120, a data reception section 1130, and a data voltage output control circuit 1140, and a data voltage output circuit 1150.

The data voltage output circuit 1150 may be configured to output a respective data voltage Vdata to each of a plurality of data lines DL disposed on the display panel 110.

The clock signal supply circuit 1120 may be configured to supply one clock signal EPI_CLK of the first type clock signal TYPE1 EPI_CLK and the second type clock signal TYPE2 EPI_CLK.

The data voltage output control circuit 1140 may control the data voltage output circuit 1150 to output a data voltage Vdata corresponding to an analog voltage of the N-th data DATA or the (N−1)-th data DATA according to whether a clock signal supplied from the clock signal supply circuit 1120 is the first type clock signal TYPE1 EPI_CLK or the second type clock signal TYPE2 EPI_CLK.

Referring to FIGS. 11 and 12, the first type clock signal TYPE1 EPI_CLK and second type clock signal TYPE2 EPI_CLK may have different signal waveforms. For example, the first type clock signal TYPE1 EPI_CLK may be a pulse type signal whose voltage level toggles or swings, and the second type clock signal TYPE2 EPI_CLK may be a DC type signal whose voltage level is constant.

Referring to FIGS. 11 and 12, the data voltage output circuit 1150 may be configured to output a data voltage Vdata corresponding to an analog voltage of the N-th data DATA when the clock signal is the first type clock signal TYPE1 EPI_CLK. The data voltage output circuit 1150 may be configured to output a data voltage Vdata corresponding to an analog voltage of the (N−1) th data DATA when the clock signal is the second type clock signal TYPE2 EPI_CLK.

Referring to FIGS. 11 and 12, when the N-th data DATA is different from the (N−1)-th data DATA, the clock signal supply circuit 1120 may be configured to supply the first type clock signal TYPE1 EPI_CLK. When the N-th data DATA is equal to the (N−1)-th data DATA, the clock signal supply circuit 1120 may be configured to supply the second type clock signal TYPE2 EPI_CLK.

Referring to FIGS. 11 and 12, the data voltage output circuit 1150 may include a latch array LAT for storing data DATA, a digital-to-analog converter array DAC for converting the data DATA stored in the latch array LAT to a data voltage Vdata corresponding to an analog voltage, and an output buffer array BUF for outputting the data voltage (Vdata) to a corresponding data line DL.

Referring to FIGS. 11 and 12, when the clock signal is the first type clock signal TYPE1 EPI_CLK, the data DATA stored in the latch array LAT may be transitioned from the (N−1)th data DATA to the N-th data DATA by the control of the data voltage output control circuit 1140. When the clock signal is the second type clock signal TYPE2 EPI_CLK, the data DATA stored in the latch array LAT may be maintained as the (N−1)th data DATA by the control of the data voltage output control circuit 1140.

Referring to FIGS. 11 and 12, the data voltage output control circuit 1140 may include a clock signal type determination circuit 1141 and a data storage controller 1142.

Referring to FIGS. 11 and 12, the clock signal type determination circuit 1141 may be configured to determine whether a clock signal EPI_CLK supplied from the clock signal supply circuit 1120 is the first type clock signal TYPE1 EPI_CLK or the second type clock signal TYPE2 EPI_CLK.

Referring to FIGS. 11 and 12, when the clock signal EPI_CLK is the first type clock signal TYPE1 EPI_CLK, the data storage controller 1142 may transition the data DATA stored in the latch array LAT included in the data voltage output circuit 1150 from the (N−1) th data DATA to the N-th data DATA. When the clock signal EPI_CLK is the second type clock signal TYPE2 EPI_CLK, the data storage controller 1142 may maintain the data DATA stored in the latch array LAT as the (N−1) th data DATA.

Referring to FIGS. 11 and 12, the clock signal supply circuit 1120 may include a data computation circuit 1121 and a clock signal controller 1122.

Referring to FIGS. 11 and 12, the data computation circuit 1121 may be configured to compare the N-th data DATA with the (N−1)-th data DATA and output a result of the comparison. For example, the data computation circuit 1121 may be a data comparing circuit for comparing the data of different frame, to determine whether the corresponding date of different frame is equal to each other.

Referring to FIGS. 11 and 12, the clock signal controller 1122 may be configured to output the first type clock signal TYPE1 EPI_CLK or supply second the second type clock signal TYPE2 EPI_CLK according to the comparison result from the data computation circuit 1121.

Referring to FIGS. 11 and 12, the low-power driving system based on the clock signal control technique of the display device 100 according to the aspects of the present disclosure may include the data driving circuit 120 configured to drive a plurality of data lines DL, and the display controller 140 configured to control the data driving circuit 120.

Referring to FIGS. 11 and 12, the display controller 140 may include the data transmission section 1110 for transmitting data DATA to the data driving circuit 120. The data driving circuit 120 may include the data reception section 1130 for receiving data DATA from the display controller 140.

Referring to FIG. 11, in the low-power driving system based on the clock signal control technique of the display device 100 according to the aspects of the present disclosure, the component that changes one of the first type clock signal TYPE1 EPI_CLK and the second type clock signal TYPE2 EPI_CLK to the other or selects any one of the first type clock signal TYPE1 EPI_CLK and the second type clock signal TYPE2 EPI_CLK may be the display controller 140.

In this aspect, the data driving circuit 120 may include the data voltage output circuit 1150 and the data voltage output control circuit 1140. The display controller 140 may include the data computation circuit 1121 and the clock signal controller 1122 included in the clock signal supply circuit 1120.

Referring to FIG. 12, in the low-power driving system based on the clock signal control technique of the display device 100 according to the aspects of the present disclosure, the component that changes one of the first type clock signal TYPE1 EPI_CLK and the second type clock signal TYPE2 EPI_CLK to the other or selects any one of the first type clock signal TYPE1 EPI_CLK and the second type clock signal TYPE2 EPI_CLK may be the data driving circuit 120.

In this aspect, the data driving circuit 120 may include the data voltage output circuit 1150 and the data voltage output control circuit 1140. The display controller 140 may include the data computation circuit 1121. The data driving circuit 120 may include the clock signal controller 1122.

Referring to FIG. 12, in the low-power driving system based on the clock signal control technique of the display device 100 according to the aspects of the present disclosure, the clock signal supply circuit 1120 included in the display controller 140 may further include a reference clock signal supply circuit 1200 configured to supply a reference clock signal EPI_CLK REF to the clock signal controller 1122 included in the data driving circuit 120.

Referring to FIG. 12, in the low-power driving system based on the clock signal control technique of the display device 100 according to the aspects of the present disclosure, the data computation circuit 1121 included in the display controller 140 may be configured to supply a clock enable signal DBE_EN to the clock signal controller 1122 included in the data driving circuit 120.

Referring to FIG. 13, during an interface driving period, the clock enable signal DBE_EN may have a high level voltage VH. During an interface down period, the clock enable signal DBE_EN may have a low level voltage VL.

Referring to FIG. 11, in one or more aspects, the display controller 140 may include the data transmission section 1110 configured to transmit the N-th data DATA to the data driving circuit 120, the data computation circuit 1121 configured to determine whether the N-th data DATA is equal to the (N−1)-th data DATA, and the clock signal controller 1122 configured to output the first type clock signal TYPE1 EPI_CLK to the data driving circuit 120 when the N-th data DATA is equal to the (N−1)-th data DATA, and output the second type clock signal TYPE2 EPI_CLK different from the first type clock signal TYPE1 EPI_CLK to the data driving circuit 120 when the N-th data DATA is different from the (N−1)-th data DATA.

Referring to FIG. 11, in one or more aspects, the data driving circuit 120 may include the data reception section 1130 configured to receive the N-th data DATA following the (N−1)-th data DATA from the display controller 140, the latch array LAT in which the (N−1)th data DATA is stored, the clock signal type determining circuit 1141 configured to determine whether a clock signal EPI_CLK received from the display controller 140 is the first type clock signal TYPE1 EPI_CLK or the second type clock signal TYPE2 EPI_CLK, and the data storage controller 1142 controlling the N-th data DATA to be stored in the latch array LAT when the clock signal EPI_CLK is the first type clock signal TYPE1 EPI_CLK, and controlling the N-th data DATA not to be stored in the latch array LAT when the clock signal EPI_CLK is the second type clock signal TYPE2 EPI_CLK.

Referring to FIG. 12, in one or more aspects, the display controller 140 may include the data transmission section 1110 configured to transmit the N-th data DATA to the data driving circuit 120, the data computation circuit 1121 configured to determine whether the N-th data DATA is equal to the (N−1)-th data DATA, output a clock enable signal DBE_EN having a low level voltage when the N-th data DATA is equal to the (N−1)-th data DATA, and output a clock enable signal DBE_EN having a high level voltage when the N-th data DATA is different from the (N−1)-th data DATA, and a reference clock signal supply circuit 1200 configured to supply a reference clock signal whose voltage level toggles or swings.

Referring to FIG. 12, in one or more aspects, the data driving circuit 120 may include the data reception section 1130 configured to receive the N-th data DATA following the (N−1)-th data DATA from the display controller 140, the latch array LAT in which the (N−1)th data DATA is stored, the clock signal controller 1122 configured to receive a clock enable signal DBE_EN from the display controller 140, and output any one of the first type clock signal TYPE1 EPI_CLK and the second type TYPE2 according to the clock enable signal DBE_EN, the clock signal type determination circuit 1141 configured to determine whether a clock signal EPI_CLK output from the clock signal controller 1122 is the first type clock signal TYPE1 EPI_CLK or the second type TYPE2, and the data storage controller 1142 controlling the N-th data to be stored in the latch array LAT when the clock signal EPI_CLK is the first type clock signal TYPE1 EPI_CLK, and controlling the N-th data DATA not to be stored in the latch array LAT when the clock signal EPI_CLK is the second type clock signal TYPE2 EPI_CLK.

Figure 14:
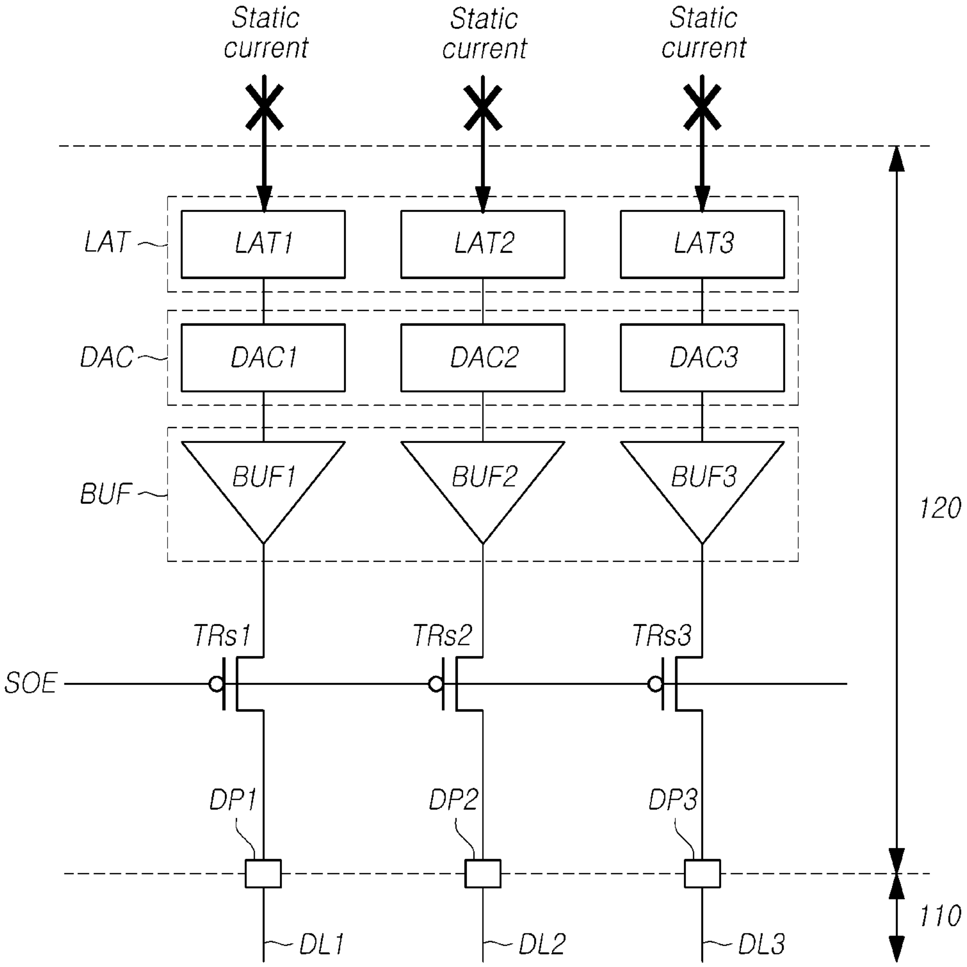
FIG. 14 illustrates an example phenomenon in which static current is blocked in the data driving circuit by the low-power driving of the display device according to aspects of the present disclosure.

FIG. 14 illustrates an example phenomenon in which static current is blocked in the data driving circuit 120 by the low-power driving of the display device 100 according to aspects of the present disclosure.

Referring to FIG. 14, according to low-power driving of the display device 100 according to aspects of the present disclosure, as the second type clock signal TYPE2 EPI_CLK is supplied or selected in a situation where there occurs no data transition, data DATA received from the display controller may not be stored in the latch array LAT, and thus, by using data DATA being stored in advance in the latch array LAT, an image may be displayed.

In this manner, when there occurs no data transition, by using the second type clock signal TYPE2 EPI_CLK different from the first type clock signal TYPE1 used when there occurs a data transition, since a storage operation for storing data DATA in the latch array LAT, a conversion operation by the digital-to-analog converter array DAC, and an output operation by the output buffer array BUF may be omitted or simplified, static current that may be caused in the latch array LAT, the digital-to-analog converter array DAC, and the output buffer array BUF may be therefore removed. As a result, undesirable power consumption due to such static current that may be caused in the data driving circuit 120 when there occurs no data transition may be prevented.

The aspects described above will be briefly described as follows.

According to one or more aspects of the present disclosure, a display device may be provided that includes: a display panel including a plurality of data lines; a data voltage output circuit configured to output a respective data voltage to each of the plurality of data lines; a clock signal supply circuit configured to supply any one of a first type clock signal and a second type clock signal, which are different from each other; and a data voltage output control circuit configured to control the data voltage output circuit to output a data voltage corresponding to an analog voltage of N-th data or (N−1)-th data to the plurality of data lines the display panel according to whether a clock signal supplied from the clock signal supply circuit is the first type clock signal or the second type clock signal.

The first type clock signal and the second type clock signal may have different types of signal waveforms. For example, the first type clock signal may be a pulse type signal whose voltage level toggles or swings, and the second type clock signal may be a DC type signal whose voltage level is constant.

The data voltage output circuit may be configured to output a data voltage corresponding to an analog voltage of the N-th data when the clock signal is the first type clock signal, or output a data voltage corresponding to an analog voltage of the (N−1)-th data when the clock signal is the second type clock signal.

The clock signal supply circuit may be configured to supply the first type clock signal when the N-th data is different from the (N−1)-th data, and be configured to supply the second type clock signal when the N-th data is equal to the (N−1)-th data.

The data voltage output circuit may include a latch array including one or more latches for storing data, a digital-to-analog converter array including one or more digital-to-analog converters for converting data stored in the latch array into a data voltage corresponding to an analog voltage, and an output buffer array including one or more output buffers for outputting the data voltage to a corresponding data line of a plurality data line.

When the clock signal is the first type clock signal, data stored in the latch array may be transitioned from (N−1)th data to N-th data by the control of the data voltage output control circuit.

When the clock signal is the second type clock signal, data stored in the latch array may be maintained as (N−1)th data by the control of the data voltage output control circuit.

The data voltage output control circuit may include a clock signal type determination circuit configured to determine whether a clock signal supplied from the clock signal supply circuit is the first type clock signal or the second type clock signal, and a data storage controller configured to transition, from the (N−1)-th data to the N-th data, data stored in the latch array of the data voltage output circuit when the clock signal is the first type clock signal, or maintain, as the (N−1)-th data DATA, the data stored in the latch array when the clock signal is the second type clock signal.

The clock signal supply circuit may include a data computation circuit configured to compare the N-th data with the (N−1)-th data and output a result from the comparison, and a clock signal controller configured to output the first type clock signal or supply the second type clock signal according to the comparison result.

In one or more aspects, the display device may include a data driving circuit configured to drive a plurality of data lines, and a display controller configured to control the data driving circuit.

For example, the data driving circuit may include the data voltage output circuit and the data voltage output control circuit, and the display controller may include the clock signal supply circuit.

In another example, the data driving circuit may include the data voltage output circuit, the data voltage output control circuit, and the clock signal controller, and the display controller may include the data computation circuit.

The clock signal supply circuit included in the display controller may further include a reference clock signal supply circuit configured to supply a reference clock signal to the clock signal controller included in the data driving circuit. The data computation circuit included in the display controller may be configured to supply a clock enable signal to the clock signal controller included in the data driving circuit.

When there occurs no data transition, the clock enable signal may have a low level voltage. When there occurs a data transition, the clock enable signal may have a high level voltage.

According to one or more aspects of the present disclosure, a low-power driving method of a display device may be provided that includes: a comparing step of comparing N-th data with (N−1)-th data; a clock signal outputting step of outputting a first type clock signal when the N-th data and the (N−1)-th data are different, or outputting a second type clock signal different from the first type clock signal when the N-th data and the (N−1)-th data are equal; a data storing control step of transitioning data stored in a latch array from the (N−1) th data to the N-th data according to the first type clock signal, or maintaining the data stored in the latch array as the (N−1) th data according to the second type clock signal; and a data voltage outputting step of outputting a data voltage corresponding to an analog voltage of the data stored in the latch array to a data line disposed on the display pane.

For example, the comparing step and the clock signal outputting step may be performed by the display controller, and the data storing control step and the data voltage outputting step may be performed by the data driving circuit.

In another example, the comparing step may be performed by the display controller, and the clock signal outputting step, the data storing control step, and the data voltage outputting step may be performed by the data driving circuit.

According to one or more aspects of the present disclosure, a display controller may be provided that includes: a data transmission section configured to transmit N-th data to a data driving circuit; a data computation circuit configured to determine whether the N-th data is equal to (N−1)-th data; and a clock signal controller configured to output a first type clock signal to the data driving circuit when the N-th data is equal to the (N−1)-th data, or output a second type clock signal different from the first type clock signal to the data driving circuit when the N-th data is different from the (N−1)-th data.

According to one or more aspects of the present disclosure, a display controller may be provided that includes: a data transmission section configured to transmit N-th data to a data driving circuit; a data computation circuit configured to determine whether the N-th data is equal to (N−1)-th data, and configured to output a clock enable signal having a low level voltage when the N-th data is equal to the (N−1)-th data, or output a clock enable signal having a high level voltage when the N-th data is different from the (N−1)-th data; and a reference clock signal supply circuit configured to supply a reference clock signal whose voltage level toggles or swings.

According to one or more aspects of the present disclosure, a data driving circuit may be provided that includes: a data reception section configured to receive N-th data following (N−1) th data from a display controller; a latch array in which the (N−1) th data is stored; a clock signal type determination circuit configured to determine whether a clock signal received from the display controller is a first type clock signal or a second type clock signal; and a data storage controller configured to control the N-th data to be stored in the latch array when the clock signal is the first type clock signal, or control the N-th data not to be stored in the latch array when the clock signal is the second type clock signal.

According to one or more aspects of the present disclosure, a data driving circuit may be provided that includes: a data reception section configured to receive N-th data following (N−1) th data from a display controller; a latch array in which the (N−1) th data is stored; a clock signal controller configured to receive a clock enable signal from the display controller, and output any one of a first type clock signal and a second type clock signal according to the clock enable signal; a clock signal type determination circuit configured to determine whether a clock signal output from the clock signal controller is the first type clock signal or the second type clock signal; and a data storage controller configured to control the N-th data to be stored in the latch array when the clock signal is the first type clock signal, or control the N-th data not to be stored in the latch array when the clock signal is the second type clock signal.

According to the aspects described herein, by controlling clock signals needed for data driving, a display device, a display controller, and a data driving circuit may be provided that are capable of being driven with low power, and a method may be provided that drives, with low power, the display device, the display controller, and the data driving circuit.

According to the aspects described herein, by controlling clock signals needed for data driving, a display device, a display controller, and a data driving circuit may be provided that are configured to be suitable for conditions such as an eco-friendly environment, a mobile environment, a battery usage environment, or the like, and a method may be provided that drives the display device, the display controller, and the data driving circuit with low power to be suitable for such conditions.

It will be apparent to those skilled in the art that various modifications and variations can be made in the display controller, the data driving circuit, and the low-power driving method of the present disclosure without departing from the spirit or scope of the aspects. Thus, it is intended that the present disclosure covers the modifications and variations of the aspects provided they come within the scope of the appended claims and their equivalents.

What is claimed is:

1. A display device comprising:

a display panel including a plurality of data lines;

a data voltage output circuit configured to output a respective data voltage to each of the plurality of data lines;

a clock signal supply circuit configured to supply any one of a first type clock signal and a second type clock signal, which are different from each other; and a data voltage output control circuit configured to control the data voltage output circuit to output a data voltage corresponding to an analog voltage of N-th data or (N−1)-th data to the plurality of data lines of the display panel according to whether a clock signal supplied from the clock signal supply circuit is the first type clock signal or the second type clock signal, wherein the (N−1)-th data is corresponding to date of a current frame, and the N-th data is corresponding to date of a next frame of the current frame.

2. The display device of claim 1, wherein the first type clock signal and the second type clock signal have different types of signal waveforms, and wherein the first type clock signal is a pulse type signal whose voltage level toggles or swings, and the second type clock signal is a DC type signal whose voltage level is constant.

3. The display device of claim 1, wherein the data voltage output circuit is configured to output a data voltage corresponding to an analog voltage of the N-th data when the clock signal is the first type clock signal, and output a data voltage corresponding to an analog voltage of the (N−1)-th data when the clock signal is the second type clock signal.

4. The display device of claim 1, wherein the clock signal supply circuit is configured to supply the first type clock signal when the N-th data is different from the (N−1)-th data, and supply the second type clock signal when the N-th data is equal to the (N−1)-th data.

5. The display device of claim 1, wherein the data voltage output circuit comprises:

a latch array storing data;

a digital-to-analog converter array converting data stored in the latch array into a data voltage corresponding to an analog voltage; and an output buffer array outputting the data voltage to a corresponding data line, wherein when the clock signal is the first type clock signal, the data stored in the latch array is transitioned from the (N−1)-th data to the N-th data, or when the clock signal is the second type clock signal, the data stored in the latch array is maintained as the (N−1)-th data.

6. The display device of claim 1, wherein the data voltage output circuit comprises:

a clock signal type determination circuit configured to determine whether the clock signal supplied from the clock signal supply circuit is the first type clock signal or the second type clock signal; and a data storage controller configured to transition, from the (N−1)-th data to the N-th data, the data stored in the latch array included in the data voltage output circuit when the clock signal is the first type clock signal, or maintain, as the (N−1)-th data, the data stored in the latch array when the clock signal is the second type clock signal.

7. The display device of claim 1, wherein the clock signal supply circuit comprises:

a data computation circuit configured to compare the N-th data with the (N−1)-th data and output a result from the comparison; and a clock signal controller configured to output the first type clock signal or supply the second type clock signal according to the comparison result.

8. The display device of claim 7, further comprising:

a data driving circuit configured to drive the plurality of data lines; and a display controller configured to control the data driving circuit, wherein the data driving circuit comprises the data voltage output circuit and the data voltage output control circuit, and wherein the display controller comprises the clock signal supply circuit.

9. The display device of claim 7, further comprising:

a data driving circuit configured to drive the plurality of data lines; and a display controller configured to control the data driving circuit, wherein the data driving circuit comprises the data voltage output circuit, the data voltage output control circuit, and the clock signal controller, and the display controller comprises the data computation circuit.

10. The display device of claim 9, wherein the data computation circuit included in the display controller is configured to supply a clock enable signal to the clock signal controller included in the data driving circuit, and wherein when there occurs no data transition, the clock enable signal has a high level voltage, and when there occurs a data transition, the clock enable signal has a high level voltage.

11. A low-power driving method of a display device comprising a display panel comprising a plurality of data lines, a data driving circuit configured to drive the plurality of data lines, and a display controller configured to control the data driving circuit, the low-power driving method comprising:

a comparing step of comparing N-th data with (N−1)-th data;

a clock signal outputting step of outputting a first type clock signal or a second type clock signal different from the first type clock signal;

a data storing control step of transitioning data stored in a latch array from the (N−1)th data to the N-th data according to the first type clock signal, or maintaining the data stored in the latch array as the (N−1)th data according to the second type clock signal; and a data voltage outputting step of outputting a data voltage corresponding to an analog voltage of the data stored in the latch array to a data line disposed on the display pane, wherein the (N−1)-th data is corresponding to date of a current frame, and the N-th data is corresponding to date of a next frame of the current frame.

12. The low-power driving method of claim 11, wherein the comparing step and the clock signal outputting step are performed by the display controller, and the data storing control step and the data voltage outputting step are performed by the data driving circuit.

13. The low-power driving method of claim 11, wherein the comparing step is performed by the display controller, and the clock signal outputting step, the data storing control step, and the data voltage outputting step are performed by the data driving circuit.

14. The low-power driving method of claim 11, wherein, in the clock signal outputting step, output a first type clock signal when the N-th data and the (N−1)-th data are different, and output a second type clock signal different from the first type clock signal when the N-th data and the (N−1)-th data are equal.

15. A display controller comprising:

a data transmission section configured to transmit N-th data to a data driving circuit;

a data computation circuit configured to determine whether the N-th data is equal to (N−1)-th data; and a clock signal controller configured to output a first type clock signal or output a second type clock signal different from the first type clock signal to the data driving circuit, wherein the (N−1)-th data is corresponding to date of a current frame, and the N-th data is corresponding to date of a next frame of the current frame.

16. The display controller of claim 15, wherein the first type clock signal and the second type clock signal have different types of signal waveforms, and wherein the first type clock signal is a pulse type signal whose voltage level toggles or swings, and the second type clock signal is a DC type signal whose voltage level is constant.

17. The display controller of claim 15, wherein the clock signal controller outputs a first type clock signal to the data driving circuit when the N-th data is equal to the (N−1)-th data, and outputs a second type clock signal different from the first type clock signal to the data driving circuit when the N-th data is different from the (N−1)-th data.

18. A display controller comprising:

a data transmission section configured to transmit N-th data to a data driving circuit;

a data computation circuit configured to determine whether the N-th data is equal to (N−1)-th data, and configured to output a clock enable signal having a low level voltage when the N-th data is equal to the (N−1)-th data, and output a clock enable signal having a high level voltage when the N-th data is different from the (N−1)-th data; and a reference clock signal supply circuit configured to supply a reference clock signal whose voltage level toggles or swings, wherein the (N−1)-th data is corresponding to date of a current frame, and the N-th data is corresponding to date of a next frame of the current frame.

19. A data driving circuit comprising:

a data reception section configured to receive N-th data following (N−1)th data from a display controller;

a latch array in which the (N−1)th data is stored;

a clock signal type determination circuit configured to determine whether a clock signal received from the display controller is a first type clock signal or a second type clock signal; and a data storage controller configured to control the N-th data to be stored in the latch array when the clock signal is the first type clock signal, or control the N-th data not to be stored in the latch array when the clock signal is the second type clock signal, wherein the (N−1)-th data is corresponding to date of a current frame, and the N-th data is corresponding to date of a next frame of the current frame.

20. The data driving circuit of claim 19, wherein the first type clock signal and the second type clock signal have different types of signal waveforms, and wherein the first type clock signal is a pulse type signal whose voltage level toggles or swings, and the second type clock signal is a DC type signal whose voltage level is constant.

21. A data driving circuit comprising:

a data reception section configured to receive N-th data following (N−1)th data from a display controller;

a latch array in which the (N−1)th data is stored;

a clock signal controller configured to receive a clock enable signal from the display controller, and output one of a first type clock signal and a second type clock signal according to the clock enable signal;

a clock signal type determination circuit configured to determine whether a clock signal output from the clock signal controller is the first type clock signal or the second type clock signal; and a data storage controller configured to control the N-th data to be stored in the latch array when the clock signal is the first type clock signal, or control the N-th data not to be stored in the latch array when the clock signal is the second type clock signal, wherein the (N−1)-th data is corresponding to date of a current frame, and the N-th data is corresponding to date of a next frame of the current frame.

22. The data driving circuit of claim 21, wherein the first type clock signal and the second type clock signal have different types of signal waveforms, and wherein the first type clock signal is a pulse type signal whose voltage level toggles or swings, and the second type clock signal is a DC type signal whose voltage level is constant.

23. A display device comprising:

a display panel including a plurality of data lines;

a data driving circuit configured to drive the plurality of data lines;

a latch array storing (N−1)-th data corresponding to (N−1)-th frame;

a data comparing circuit configured to comparing the (N−1)-th data corresponding to the (N−1)-th frame and N-th data corresponding to N-th frame;

a clock signal supply circuit configured to supply a first type clock signal or a second type clock signal different from the first type clock signal according to whether the N-th data is equal to the (N−1)-th data, wherein when the N-th data is equal to the (N−1)-th data, corresponding data stored in the latch array is maintained, and when the N-th data is unequal to the (N−1)-th data, corresponding date stored in the latch array is transitioned from the (N−1)-th data to the N-th data, wherein the (N−1)-th frame is a current frame, and the N-th frame is a next frame of the current frame.

* * * * *